Oct. 9, 1956 G. DARSIE 2,766,394
HEADLIGHT
Filed Feb. 18, 1955
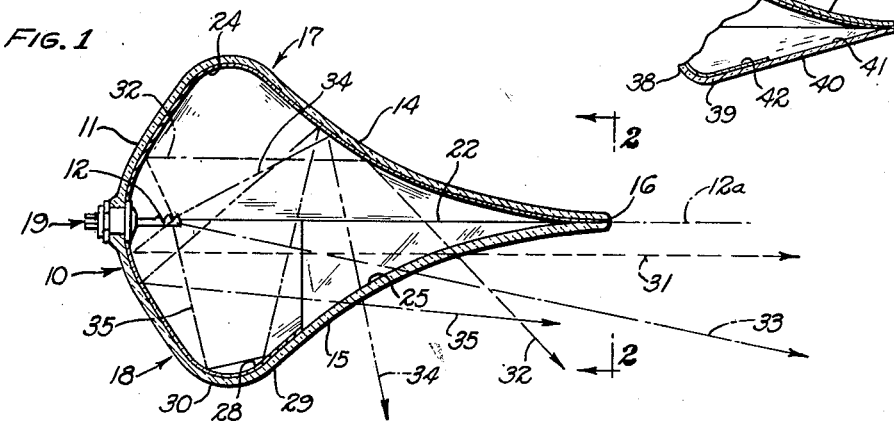
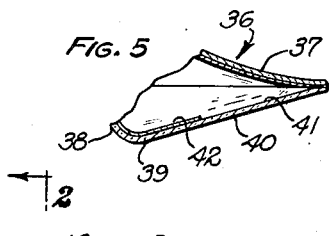
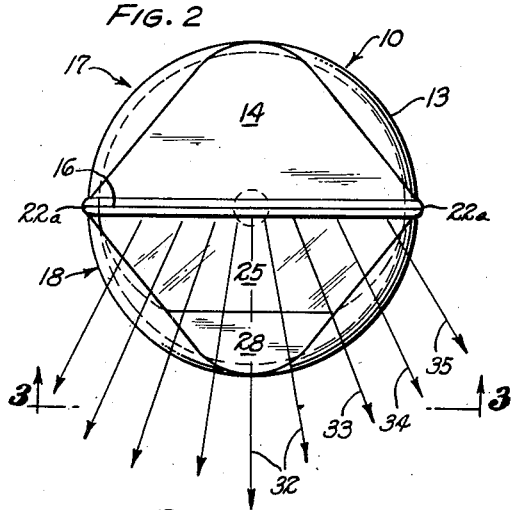
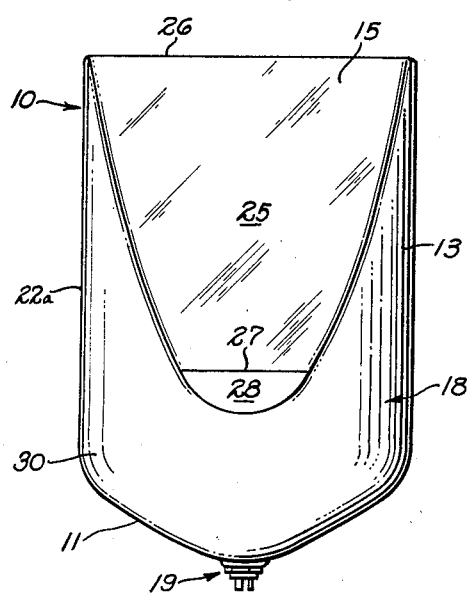
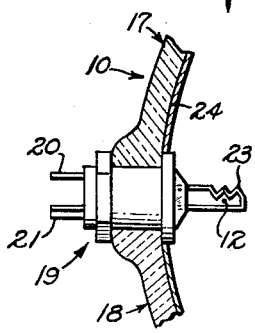
INVENTOR:
GEORGE DARSIE
By D. Gordon Argus, ATTORNEY

United States Patent Office 2,766,394
Patented Oct. 9, 1956

2,766,394
HEADLIGHT
George Darsie, San Marino, Calif.
Application February 18, 1955, Serial No. 489,062
4 Claims. (Cl. 313—114)

This invention relates to a headlight, and has for one of its objects to provide an automobile headlamp which illuminates a continuous path in front of the car while also limiting the emergent light rays to paths which do not blind oncoming motorists.

A further object is to provide a headlight of this character in a unitary and rugged "sealed beam" construction.

This invention is carried out in combination with an incandescent filament, and a suitable reflector for directing rays forward from the filament. A curved tubular shell joins the reflector and extends axially and forwardly of the reflector. This shell is modified by two opposed surfaces which converge toward each other as they depart from the reflector.

A feature of the invention resides in a reflective coating which is applied to all of the reflector, the shell, and the opposed surfaces, with the exception of a "window" in one of the opposed surfaces; said window being placed forward of the reflector, there being a coated area between the reflector and the "window."

A further feature of this invention resides in a curved transition region between the lower of said opposed surfaces and the reflector which serves to reflect light incident thereon to reflecting areas operative to send the light downward and onto the path in front of the automobile, rather than upwardly into the eyes of oncoming drivers.

A preferred but optional feature resides in making both of the opposed surfaces in the conformation of "bent planes" which converge to meet at the end of the headlight removed from the reflector; that is, the front end thereof. These opposed surfaces are preferably made convex toward each other. "Bent planes" are here defined as curved surfaces generated by straight lines all of which are parallel to each other.

Another preferred but optional feature resides in constructing the headlight in two sections which are structurally mirror images of each other, and joining the edges of said two sections so as to form an integral "sealed beam" headlight.

The above and other features of this invention will be fully appreciated from the following detailed description and the accompanying drawings, in which:

Fig. 1 is a side elevation, partly in cross-section, of a headlight according to the invention;

Fig. 2 is an end view taken at line 2—2 of Fig. 1;

Fig. 3 is a bottom view taken at line 3—3 of Fig. 2;

Fig. 4 is a detailed view of an incandescent filament suitable for use in the headlight of Fig. 1; and Fig. 5 is a fragmentary view in cross-section of another form of headlight according to the invention.

The headlight 10, as shown in the drawings, has a rear reflector 11, which may conveniently have the configuration of a paraboloid of revolution, and may be of any desired depth and curvature. It will be understood that reflectors of shapes other than parabolic are also useful. However, parabolic reflectors have the advantage that light rays from the focus 12 are reflected as a "bundle" of parallel rays which are parallel to the central axis 12a of the reflector. A tubular shell 13, which is preferably cylindrical, joins the reflector at its outer edge, and extends forwardly from the reflector.

The shell 13 is modified by two opposed surfaces: an upper surface 14, and a lower surface 15. These surfaces are preferably formed as "bent planes," wherein they may be considered as surfaces developed by generating lines all of which are parallel to each other. The surfaces converge toward each other as they depart from the reflector, and meet at a line-joint 16 at the front end of the headlight. The upper and lower surfaces 14, 15, are convex toward each other, and are conveniently, although not necessarily, cylindrical in nature, each having a center of curvature on its own side of the headlight. A suitable radius of curvature for surfaces 14 and 15 is approximately 5 times the radius of the shell. The surfaces 14, 15 preferably extend over a major portion of the length of the shell.

For ease in manufacture, the headlight may be cast in two sections, an upper section 17 which includes one half of the reflector and shell, and the upper surface 14, and a lower section 18, which includes the other half of the reflector and shell, and the lower surface 15. These sections are mirror images of each other. By the use of methods well-known in the art, an electrode assembly 19 with terminal leads 20, 21 can be placed between the sections. The structure can then be fused along the joint 22 between the sections, and the lamp evacuated. A rib 22a may result from this joinder, which can be used to guide the headlamp into a matching groove in an automobile for mounting purposes. This results in a permanent mount which will remain in alignment. If desired, some inert gas such as nitrogen can be admitted to the lamp.

An incandescent filament 23 is connected to the leads 20, 21. The preferred form of filament is elongated, and is disposed at the focus of the reflector. Preferably the filament is elongated and extends along the central axis of the reflector. Filaments for this purpose are well-known, and require no detailed discussion here.

A reflective coating 24, which may be silver, aluminum, or any other desired reflecting substance, covers all of the inside of the headlight except for the region occupied by the electrode assembly and a "window" 25. Window 25 is an unsilvered, transparent region at the forward end of the lower surface 15. The forward edge of the window coincides with the forward edge 26 of the lower curved surface, and the rear edge 27 of the window is disposed somewhat forward of the rearward intersection of the shell and the lower surface 15. This arrangement leaves a rear silvered area 28 on the lower surface 15, which area 28 is disposed at converging attitude toward the central axis of the headlight; that is, the area 28 toward said central axis.

A curved transition region 29 may be provided at the rearward edge of the silvered area 28 by giving the lower surface 15 a reverse curve where it joins the shell. Such a transition region may be provided at both curved surfaces, and it is also preferable to make the intersection of the shell and the reflector a smooth curve 30 as shown in Fig. 3, rather than a sharp angular joint.

In Fig. 5 there is shown another configuration of headlight 36 in which the upper surface 37, reflector 38 and shell 39 may have the same shape as the corresponding parts of the headlight shown in Fig. 1. The lower surface 40 is somewhat different, however, and is merely a flat plane. The interior of this headlight is generally silvered, and a "window" 41 comprising an unsilvered area is provided at the forward end of the lower surface. A silvered area 42 therefore remains forward of the reflector which is at a coverging attitude to the central axis of the headlight.

The embodiment of Fig. 5 illustrate that the surface configuration of the "window" is immaterial, since its sole purpose is to transmit the light. However, the rear silvered areas 28 and 42 in the headlights are preferably curved for best optical properties, although this is not essential. Thus silvered surface 28 is curved, while silvered surface 42 is planar. These silvered surfaces are most conveniently made smoothly continuous with the window surface, although it will be recognized that this forms no limitation on either the window or the silvered surfaces 28 and 42.

The optical properties of the headlight of Fig. 1 will be better appreciated from an examination of that figure, in which a few exemplary rays have been drawn. Rays 31 and 32 represent light beams which are initially directed rearward toward the reflector, and which are ordinarily reflected forward as rays parallel to the central axis of the reflector. Ray 31 is below the central axis and escapes through the window 25 as a level beam. Ray 32 is above the central axis, and is reflected by the reflector to the upper curved surface 14, which in turn reflects the light downward through the window to illuminate a path in front of the headlight. The curvature of the upper surface 14 is continuous, and the "bundle" of parallel rays 32 incident thereon is smoothly "spread out" along a path in front of the automobile.

Ray 33 is typical of rays below the axis of the reflector which emit from the filament and proceed forwardly without impinging on the reflector. Rays 33, within the limits of the window, serve to illuminate the path by passing directly through the window.

Rays 31, 32 and 33 provide a full forward beam, all rays of which are directed below the central axis of the reflector. It will be appreciated that a full and even illumination occurs along the path, since there is a full illumination of the reflector by the filament. For example, with respect to rays 32, similar rays striking the reflector farther from its central axis are reflected to a region of the curved surface 14 closer to the reflector than shown by the exemplary ray, and are reflected to illuminate a portion of the path closer to the car than the exemplary ray. The rear edge 27 of the window limits the closeness of the illumination to the car, and silvered region 28 simply reflects rays which would be too close to the car, back into the headlight for further reflections therein until they finally escape out the window 25 in a desirable direction.

Rays 31, 32 and 33, and the similar light rays which they exemplify, cannot escape from the headlight to cross the central axis in an upward direction, and therefore provide complete, safe forward illumination which cannot glare into the eyes of oncoming motorists.

In addition to this feature, the invention provides for control of other rays which might be able to create a glare and, as a further improvement over presently-known headlights, recovers these rays and directs them in safe and useful paths, rather than simply blocking them off and losing their potential contribution to the general illumination.

As an example, consider rays 34, which ordinarily would emanate from the filament and proceed directly forward, above the central axis. The upper surface 14 reflects these rays downward to illuminate the path, and the light is conserved.

Another usefulness of the silvered region 28 will be understood from an examination of rays 35. These rays proceed to the transition region 29, just outside the parabolic reflector, but instead of being scattered to glare into the eyes of other motorists as in previous headlamps, they are intercepted by region 28, and re-reflected to surface 14, then to the reflector, and then out the window 25. Thus the transition region 29 and the silvered area 28 operate together to conserve rays from the lower part of the reflector which might have an upward component of direction. Any glare which might be caused by sharp edges of a reflector is eliminated by the transition region 29, and even were the transition region more abrupt, the silvered area 28 stops the troublesome rays which cause much of the glare in conventional headlights.

The silvered area 28 also serves to return stray light rays from surface 14 to the system.

Thus the headlight permits light to escape therefrom only through the window 25, and in paths directed below the axis of the headlight. This headlight is a rugged, unitary device which can easily be cast in its complex shape, and assembled in accordance with well-known conventional techniques.

The headlight of Fig. 5 operates in substantially the same manner, although it is preferable for the rear silvered area 42 to be curved as area 28 is in Fig. 1.

The curved reflector and shell construction provide an illuminated path of significant width, it being understood that the exemplary rays shown in Fig. 1 have counterparts at various angular positions around the central axis.

It will be recognized that while this light finds its greatest usefulness as an automobile headlight, it can also be used as a flood light or a spotlight.

Numerous changes in structural detail, such as the relative curvature of the curved surfaces, and the nature of the reflector, will be apparent to persons skilled in the art. Also, the term "silvered" herein will be understood to relate to any means for providing a reflecting surface, and does not refer particularly to a layer of metallic silver. Therefore the invention is not to be limited by the embodiment shown in the drawing and described in the description, which is given by way of example rather than of limitation, but only in accordance with the scope of the appended claims.

I claim:

1. A headlight comprising a reflector with a central axis, a tubular shell mounted to said reflector and extending axially forwardly thereof, and a pair of surfaces modifying said shell, said surfaces being convex toward each other, and being "bent planes" developed by straight line generators, all generators of both planes being parallel, said surfaces meeting at a line-joint at the end of the headlight away from the reflector, and a reflective coating over the entire surface of the reflector, shell, and curved surfaces, with the exception of a transparent window in one of said surfaces, said window being spaced from the reflector, and an incandescible filament in said headlight.

2. A headlight according to claim 1 in which the line-joint is disposed at the central axis of the reflector.

3. A reflector according to claim 1 in which the curved surface having the window has a reverse curve adjacent its intersection with the shell.

4. A headlight comprising a reflector with a central axis, a tubular shell mounted to said reflector and extending axially forward thereof, and a pair of surfaces modifying said shell, said surfaces extending toward each other as they extend away from said reflector, one of said surfaces being a "bent plane" developed by a straight line generator and the other of said surfaces being substantially planar, being developed by straight line generators, all generators of both surfaces being parallel, said surfaces meeting at a line-joint at the end of the headlight away from the reflector, and a reflective coating over the entire reflector, shell and surfaces with the exception of a transparent window in the flat plane, said window being spaced from the reflector, and an incandescible filament in said headlight.

References Cited in the file of this patent

UNITED STATES PATENTS

| Re. 17,037 | Ballman et al. | July 17, 1928 |
| 1,998,187 | Conti | Apr. 16, 1935 |
| 2,488,751 | Verbeek et al. | Nov. 22, 1949 |
| 2,699,515 | Williams | Jan. 11, 1955 |

FOREIGN PATENTS

| 657,243 | Great Britain | Sept. 12, 1951 |